L. JAUREGIN.
TRAP.
APPLICATION FILED MAY 14, 1909.

966,213.

Patented Aug. 2, 1910.

Witnesses
J. L. Wright
E. F. Bunyea

Inventor
Louis Jauregin,
By Victor J. Evans,
Attorney

UNITED STATES PATENT OFFICE.

LOUIS JAUREGIN, OF MEYERSBURG, MONTANA.

TRAP.

966,213.   Specification of Letters Patent.   Patented Aug. 2, 1910.

Application filed May 14, 1909. Serial No. 495,882.

*To all whom it may concern:*

Be it known that I, LOUIS JAUREGIN, a citizen of the United States of America, residing at Meyersburg, in the county of Park and State of Montana, have invented new and useful Improvements in Traps, of which the following is a specification.

This invention relates to traps designed more particularly for catching chicken hawks and other birds of prey, but capable of use for other purposes, and one of the principal objects of the same is to provide a trap the jaws of which are of sufficient size to inclose the victim, said jaws having wire gauze pockets to prevent the escape of the victim.

Another object of the invention is to provide a trap of simple construction which may be set upon a chicken coop and which will not injure chickens if caught in the trap.

These and other objects may be attained by means of the construction illustrated in the accompanying drawing, in which,—

Figure 1:
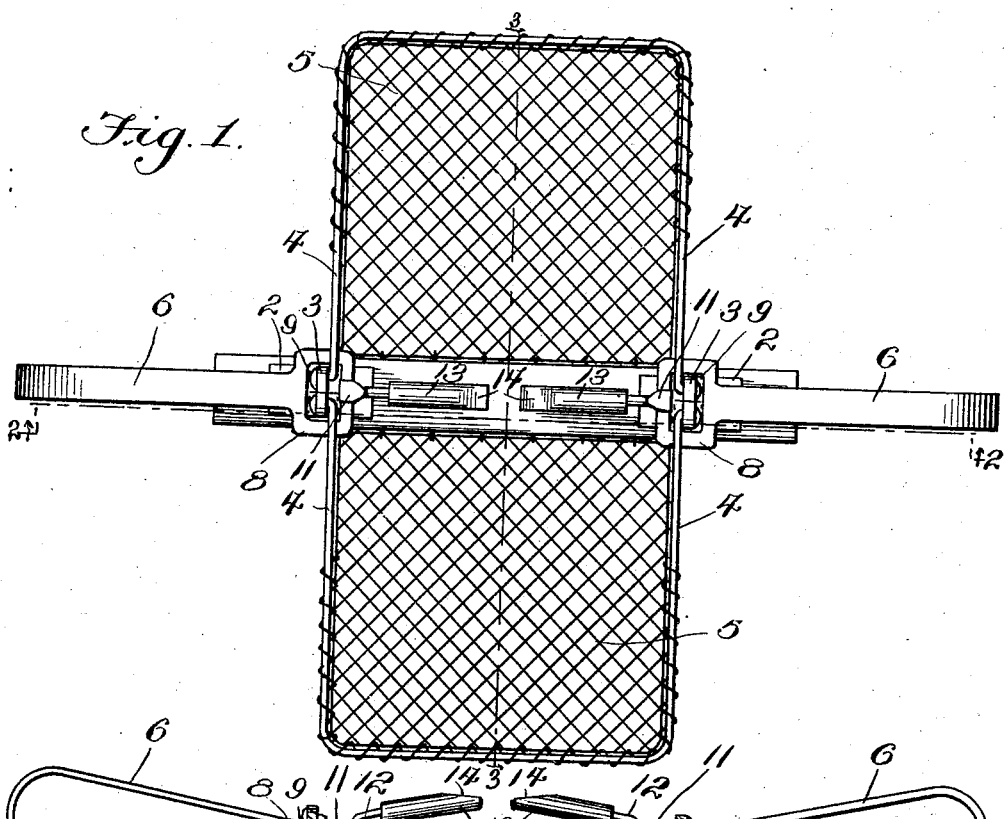
Figure 2:
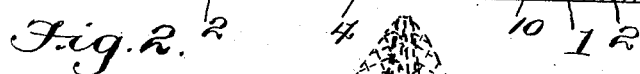
Figure 3:
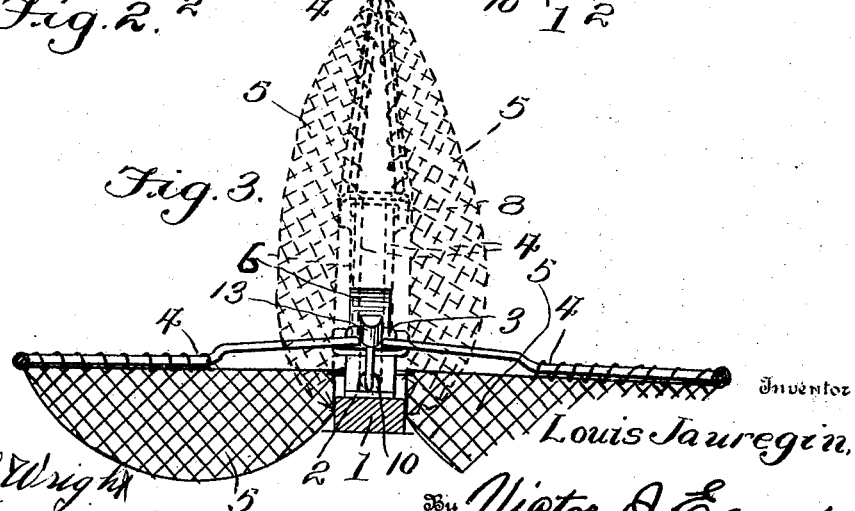

Figure 1 is a plan view of a trap made in accordance with my invention, said view showing the trap set. Fig. 2 is a transverse vertical section on the line 2—2 of Fig. 1, looking in the direction indicated by the arrows. Fig. 3 is a section on the line 3—3 of Fig. 1, looking in the direction indicated by the arrows and showing in dotted lines the position of the two jaws of the trap when sprung.

Referring to the drawing, the numeral 1 designates a base bar to which is secured near its opposite ends bearing plates 2 having angularly disposed lugs 3. The jaw members 4 of the trap are preferably formed of wire of the proper gage, the ends of said wire being bent outwardly and pivotally connected to the lugs 3. Connected to the wire jaw members 4 are wire gauze pockets 5 of sufficient fullness when closed to give room to contain a chicken hawk or bird of considerable size. The springs 6 for closing the jaws are each provided with a slot 7 which fits over the lugs 3, while the outer member of the spring 6 is provided with a rectangular enlargement 8 provided with an opening 9 adapted to fit over the lugs 3 underneath the wire jaws 4.

The triggers each comprise a strand of wire bent upon itself to form a bearing for a staple 10 upon which the trigger is pivoted. A finger 11 is bent outward from the trigger to engage the top of the enlargement 8 inside the jaws. The opposite end of the trigger comprises an outwardly and upwardly extending shank 12 to which may be secured a tubular perch 13 having flattened upper surfaces 14.

The operation of my invention may be briefly described as follows: When the spring 6 is compressed and the jaw members 4 opened out, the finger 11 on each of the triggers is engaged with the inner bar of the enlargement 8 of the spring 6 to hold the jaw members flat and to secure the trap in set condition. Should a bird step upon the trap upon the perches 13, the triggers 11 will be released from the springs 6, and the two members 4 will be brought together to inclose the victim in the pockets 5.

The perches 13 are very close together at their inner ends and hence a bird alighting upon the trap to secure the bait would depress both of the perches and thus spring the trap.

It will be obvious from the foregoing that if a chicken should be caught in the trap, it would be caught alive and that the victims caught in the trap are not injured but are held in the pockets 5 and not permitted to escape.

I claim:—

In a bird trap the combination with an oblong base, a pair of oppositely positioned wire covered frames pivoted to the base, oppositely positioned U-shaped spring members fixedly secured at one end to the base and having openings adjacent to their free ends to receive the opposite staples secured to the base and arranged adjacent to the terminals of said springs; of a pair of oppositely positioned triggers each including a single piece of wire bent upon itself between its middle and one end to provide sides of unequal length, said sides being curved outwardly for short distances at the point of bending to provide an eye to loosely receive one of said staples, the shorter of said sides terminating in an outwardly extending finger to engage the free end portion of the adjacent spring, the longer of said sides terminating at a point beyond the finger in an inclined shank extending to a point adjacent to the center of the base, and tubular perches receiving and fixedly secured to the shank, for the purposes described.

In testimony whereof I affix my signature in presence of two witnesses.

LOUIS JAUREGIN.

Witnesses:
  THOMAS KOLDENBURG,
  ROYAL I. HUNTER.